Feb. 5, 1935.   S. C. WHITMAN   1,989,836
OPTICAL SYSTEM FOR RECORDING SOUND ON FILM OR REPRODUCING THE SAME
Original Filed April 18, 1932
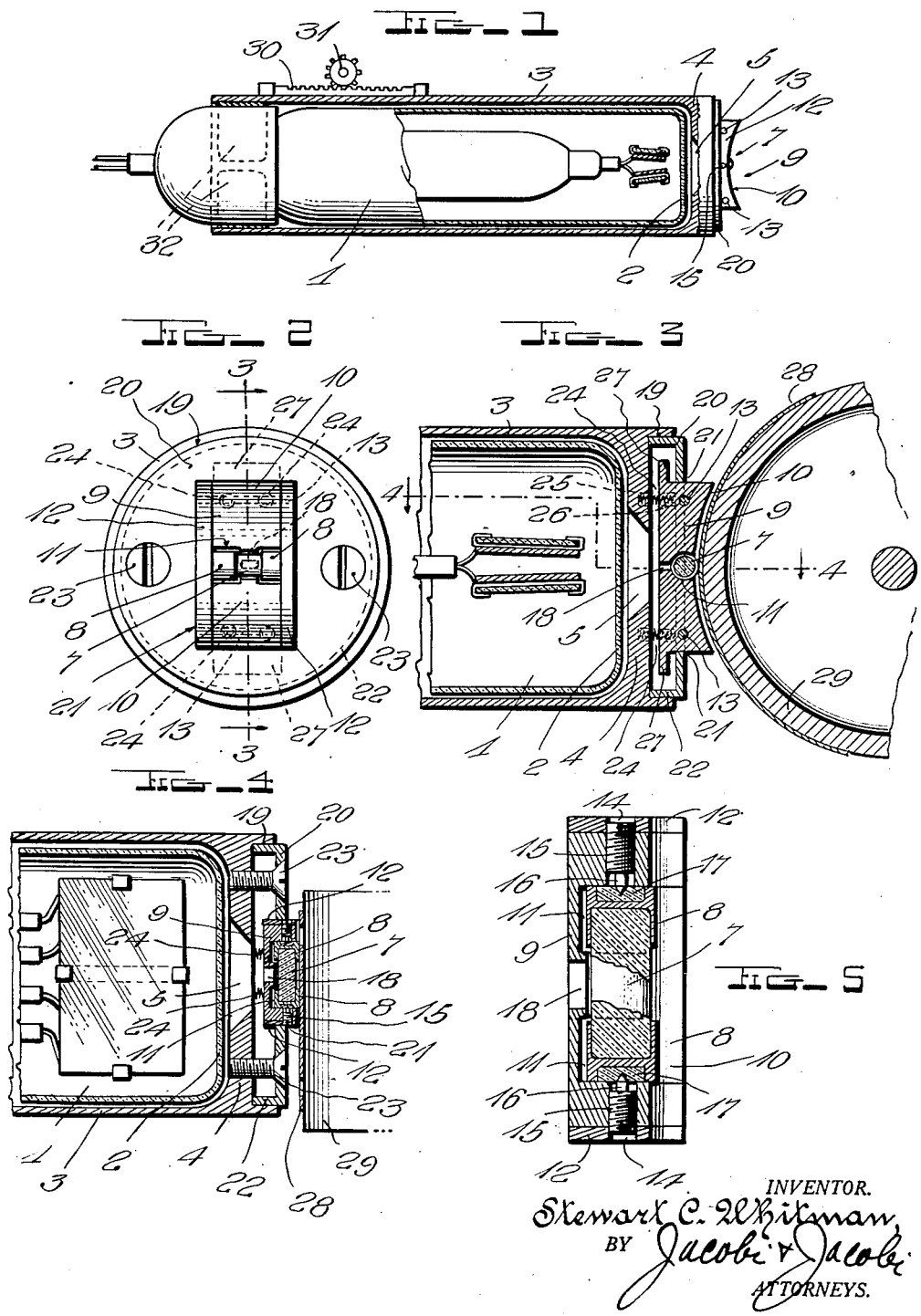
INVENTOR.
Stewart C. Whitman
BY Jacobi & Jacobi
ATTORNEYS.

Patented Feb. 5, 1935

1,989,836

UNITED STATES PATENT OFFICE 1,989,836

OPTICAL SYSTEM FOR RECORDING SOUND ON FILM OR REPRODUCING THE SAME

Stewart C. Whitman, Sunnyside, Long Island, N. Y.

Application April 18, 1932, Serial No. 605,992
Renewed December 27, 1934

18 Claims. (Cl. 88—24)

This invention relates to new and useful improvements in the art of recording sound on film and more particularly to an optical reduction device to produce this result.

An object of the invention is to produce an optical device which transmits a maximum quantity of light to the film.

Another object of the invention is to provide an optical device which eliminates the necessity of condenser lenses and mechanical apertures.

Still another object of the invention is to provide an optical reduction device and associated apparatus to accurately maintain the travelling film in the focus of the optical device at all times.

A further object of the invention is to produce an apparatus which eliminates sliding frictional contact between parts of the apparatus and the film.

A still further object of the invention is to produce an optical reduction device and associated apparatus to record and reproduce unusually high frequencies.

Still another object of the invention is to provide an apparatus which may be quickly adjusted and which cannot be casually shifted out of adjustment during operation.

With these and numerous other objects in view, my invention consists in the novel features of construction, combination, and arrangement of parts as will be hereinafter referred to and more particularly pointed out in the specification and claims.

In the drawing, forming a part of this application:

Figure 1 is a side elevation of my improved optical device, partly in section, showing its relation to a recording lamp;

Figure 2 is a front elevation on an enlarged scale;

Figure 3 is a fragmentary vertical longitudinal section taken on the line 3—3 of Figure 2, showing its relation to a recording lamp, the coacting camera roller and the film carried thereby;

Figure 4 is a fragmentary horizontal section taken on the line 4—4 of Figure 3, showing its relation to a recording lamp, the coacting camera roller and the film carried thereby; and Figure 5 is a horizontal section on an enlarged scale showing more particularly the pivotal mounting of the rotatable lens member in its mounting block, said block being detached from its adjacent apparatus.

The above elements and their various arrangements will be more particularly described in the disclosure which follows.

The system known as "variable density glow lamp recording" requires the beam of light arriving at the film to have the form of a very narrow slit usually of the order of .001 inch. Usually, some form of mechanical aperture of appropriate dimensions is utilized to accomplish this. The use of such a mechanical aperture obviously cuts down the available light tremendously and also distorts the edges of the light beam passing therethrough because of edge diffraction. In many cases, it is not practical to position this aperture in contact with the surface of the film and consequently light dispersion occurs before the beam strikes the film. This results in a widening of the photographed line image with a consequent loss of the higher audible frequencies. It is difficult to make such an aperture of sufficient narrowness to record the higher audible frequencies. In the cases where the slit aperture is positioned in contact with the moving film difficulty is encountered due to friction. The constant rubbing against the film tends to clog the fine slit with material from the surface of the film.

For these various reasons attempts have been made to eliminate the mechanical slit aperture by producing the line source of light optically. The most promising of these experiments have utilized some form of cylindrical lens. The collected light is much greater than in the case where the mechanical aperture is used. The light beam can be brought down at the focus of the lens to produce a line of light of sufficient narrowness to record the highest audio frequencies. However, the focal length of such lenses, as may be used practically, is very short, and therefore the position of the focal line is very sharply defined. Any deviation from the exact focal line position results in rapid widening of the light beam. This fact places a serious burden upon the practical use of such lenses. The rapidly moving film must pass the optical system in such fashion that the emulsion side of the film exactly crosses the focal line of the lens. In an effort to maintain this relation friction shoes have been used to keep the moving film pressed against a guide roller. This has been found unsatisfactory due to the stretching of the film and the variation in film speed introduced. In addition, the adjustment and maintenance of a system using such lenses and associated apparatus is difficult.

The present invention provides an apparatus in which the advantages of the cylindrical lens is utilized and the faulty features eliminated.

Referring to the drawing, in which similar reference characters designate corresponding parts throughout the several views, the numeral 1 designates a recording lamp of the usual or any preferred type, although, the particular lamp disclosed herein is one of an improved type covered in my copending application, filed April 18th, 1932, Serial No. 605,990. In the particular lamp disclosed it is to be noted that the outer end area thereof is flat as shown at 2, which is most preferable in the application of my optical system to produce the maximum result. It will be understood, however, that my device is capable of use with a lamp having a rounded end, although the efficiency may not be equivalent to that effected through the use of the preferred lamp shown and above described.

My improved optical device comprises a tubular shell or the like 3 formed of any preferred material, the rear end of which is open to receive therein the lamp 1. The forward end of said shell 3 designated by the numeral 4 is provided with a central opening 5 through which the light rays from the lamp 1 are projected. In introducing the lamp 1 into the shell 3, the flat end 2 of said lamp is brought to a point adjacent the inner wall of the end member 4 of the shell, as disclosed in Figures 1, 3, and 4 of the drawing and the lamp is locked in fixed relation to the shell 3 through the medium of an expanding band 32, on the rear end of the lamp 1, although any other preferred means for fixing the relationship of these parts may be used, if desired.

Having indicated heretofore the advantages in the use of a cylindrical type lens, such type lens is utilized in my apparatus and designated in the drawing by the numeral 7, the same being carried in a pair of cap members 8 fitting the ends of said lens, as clearly shown in Figure 5 of the drawing. These cap members 8 afford means to rotatably support the lens on elements carried on the outer end of the shell 3, as will be hereinafter set forth, but the primary object of said cap members 8 will be set forth in detail hereinbelow.

As a support for the lens 7, I have shown a block member 9 formed preferably of metal, one face of which is concave as shown at 10, intersected centrally by a groove 11 extending transversely through said block. This groove receives therein the capped lens 7, as clearly shown in Figures 3 and 5, and applied to the side faces of the block 9 are the side plates 12 which are shaped to conform to the block 9 and are held thereto by means of the tie pins 13. These side plates 12 are each provided with a threaded opening 14 aligned coaxially with the groove 11 and adjustably mounted in the openings 14 are the screws 15 carrying the trunnions 16. These trunnions 16 are preferably formed of sapphire or other hard bearing material and engage bearings 17 which are mounted in cup-like recesses in the outer faces of the cap 8, as clearly shown in Figure 5. These bearings 17 may also be formed of any hard material but are preferably also of sapphire. Being supported in the manner shown and described, it will be seen that the lens 7 is rotatably supported in the block 10 between the side plates 12, the measurements of the lens with its cap 8 being such that when mounted in groove 11, a close fit is provided. It will be observed, particularly from the illustration presented in Figure 3 in the drawing, that when the lens 7 is properly supported in its mounting the outer peripheral surfaces of the caps 8 project slightly beyond the concave face 10 of the block 9.

The rear face of the block 9 is provided with a substantially rectangular opening 18 which intersects the groove 11 in which the lens 7 is disposed. This opening 18 serves to admit light from the recording lamp 1 to the lens 7 when the block 9 is properly supported on the end of the shell 3, as will be hereinafter and more particularly set forth.

The outer face of the forward end of plate 4 of the shell 3 is annularly recessed as shown at 19 and receives therein the block member 9 carrying the lens 7. A retaining disk 20 having a central opening 21, through which the block 9 is projected, is fitted into the recess 19 through the medium of the right angular annular flange 22 formed thereon, fitting snugly against the walls of the recess 19. The retaining disk 20 is removably attached to the end wall 4 of the shell 20 through the medium of the screws 23.

The block 9 is yieldingly held in position with relation to the retaining disk 20 and the wall 4 of the shell 3 through the medium of a plurality of compression springs 24, the ends of which respectively fit in sockets 25 and 26 respectively formed in the wall 4 and the rear face of the block 9, as clearly disclosed in Figure 3 of the drawing. In order to limit the outward movement of the block 9 with respect to the retaining plate 20, the lugs 27 are provided on the ends of the block 9 at the rear face thereof. Obviously, these lugs 27 limit the outward movement of the block with respect to the shell.

During operation, the block 9 is slightly depressed, as shown in Figure 3 of the drawing, wherein is illustrated the relationship of my optical device with respect to a film 28 carried on a roller 29. Any desired or preferred supporting means for the shell 3 may be provided. It is desired, however, to provide means for the adjustment of the shell longitudinally with respect to the film. To this end, I have shown a rack 30 carried on the shell 3 and operated by a pinion gear 31. This is merely illustrative of one means for movement of said shell with respect to the film and it is to be understood that any desired or preferred means may be employed.

The forward end 4 of the tubular shell 3, the annular recess 19, the block 9, the cylindrical lens 7, and the cap members 8 are dimensioned with respect to each other so that reduction and focussing of the light from the lamp 1 is accomplished in a minimum distance, effecting thereby the most efficient possible light transfer to the film 28. The apparatus is brought into contact with the film 28 carried on roller 29, sufficient pressure being provided to slightly depress the block 9 against the springs 24 as shown in Figure 3. The lamp 1 is slipped into the tubular shell 3 and firmly held in position by means of the expanding band 32, no especial care being necessary in fixing the distance of the lamp from the lens. The wall thickness of the cap members 8 is approximately equal to the focal length of the lens 7 when the lamp 1 is in position as described above. By means of the rack 30 and the pinion 31 the shell 3 and the lamp 1 may be adjusted integrally with respect to the lens 7 and the necessary focussing adjustment easily and quickly accomplished. The annular recess 19 provides adequate pace for this adjustment. As the film 1 travels past the lens 7 it is in firm contact with the outer surfaces of the caps 8 and is at all times maintained exactly in the focus of the lens 7 by virtue of the wall thicknesses of the caps 8. The lens together with the caps being free to rotate easily no sliding friction occurs between the engaged portions of apparatus and film. It is evident that the focal line of the lens does not change its position upon rotation of the lens. Any slight irregularities in film thickness are automatically compensated for by the springs 24, the focal distance between lens and film remaining invariable. Due to the space maintained between lens and film and due also to the rotary motion of the lens mounting it is impossible for foreign material to accumulate between the lens and the film. The central rectangular opening 21 in the retaining disc 20 provides a snug sliding fit through which the block member 9 projects. This nice fit prevents any rocking motion of the block during operation.

The rectangular opening 18 transmits the light from the recording lamp to the lens. It is desirable to provide as large an opening as possible. However, care must be taken to prevent light from being reflected around the outside of the lens and hence to the film. I have found that an opening one-third as wide as the diameter of the lens to operate satisfactorily. This dimension may of course be modified depending on the fit between the lens and the transverse groove 11 wherein it rotates. It will be noted also that the longitudinal dimension of the opening 18 is smaller than the distance between the inner adjacent edges of the caps 8. If this were not provided, any slight irregularities in the edges of the caps would cause modulations in the recorded sound.

I have found that for various optical and mechanical reasons that a cylindrical lens of small diameter, of the order of ⅛ inch, is most satisfactory in producing a slit of light of the required narrowness for recording the highest audible frequencies. It can be seen that a lens of these dimensions must revolve at high speed when used in my apparatus. For this reason, I prefer jeweled step bearings which are adjustable, although I do not wish to be so limited.

While I have illustrated the operation and use of my invention in the above disclosure as applied to recording sound on film, I wish it to be clearly understood that I do not desire to be so limited since my invention is equally valuable in reproduction when the known substitutions in associated apparatus are made.

Having thus described the invention, what I claim is:

1. In an optical apparatus of the class described, a cylindrical lens interposed between a light source and film, a rotatable mounting therefor, and means for yieldingly retaining the mounting in contact with said film.

2. In an optical apparatus of the class described, a lens supporting member yieldingly mounted between a light source and film, a cylindrical lens, and means rotatably supporting said lens in said supporting member and adapted for normal mounting in contact with said film.

3. In an optical apparatus of the class described, a lens supporting member yieldingly mounted between a light source and film, a cylindrical lens, means rotatably supporting said lens in said supporting member, said last mentioned means being adapted for normal yielding contact with said film.

4. In an optical apparatus of the class described, a cylindrical lens adapted to be interposed between a light source and film, rotatable end mountings for said lens having portions thereof projecting beyond the peripheral surface of the lens and in normal contact with said film.

5. In an optical apparatus of the class described, a cylindrical lens adapted to be interposed between a light source and film, rotatable cap-like end mountings for said lens having portions thereof projecting beyond the peripheral surface of the latter and means for yieldingly supporting said mountings in normal contact with said film.

6. In an optical apparatus of the class described, a cylindrical lens adapted to be interposed between a light source and film, rotatable end mountings for said lens having portions thereof projecting beyond the peripheral surface of the lens a distance at least equivalent to the principal focal length thereof, and in normal contact with said film.

7. In an optical apparatus of the class described, a cylindrical lens adapted to be interposed between a light source and film, rotatable cap-like end mountings for said lens having portions thereof projecting beyond the peripheral surface of the lens a distance at least equivalent to the principal focal length thereof, and means for yieldingly supporting said mountings in normal contact with said film.

8. In an optical apparatus of the class described, a lens supporting member adapted to be yieldingly mounted between a light source and film, a cylindrical lens rotatably mounted on said member, said lens having means projecting beyond the peripheral surface thereof in normal contact with said film.

9. In an optical apparatus of the class described, a lens supporting member adapted to be yieldingly mounted between a light source and film, a cylindrical lens rotatably mounted on said member, said lens having means projecting beyond the peripheral surface thereof in normal contact with said film, and means for limiting the movement of said lens supporting member.

10. In an optical apparatus of the class described, a lens supporting member adapted to be yieldingly mounted between a light source and film, a cylindrical lens rotatably mounted thereon, means on said lens projecting beyond the peripheral surface thereof to a distance at least equivalent to the principal focal length of said lens and in normal contact with said film.

11. In an optical apparatus of the class described, a lens supporting member adapted to be yieldingly mounted between a light source and film, a cylindrical lens rotatably mounted thereon, means on said lens projecting beyond the peripheral surface thereof to a distance at least equivalent to the principal focal length of said lens and in normal contact with said film, and means for limiting the movement of said lens supporting member.

12. In an optical apparatus of the class described, a cylindrical lens, means rotatably supporting said lens adapted to be interposed between a light source and film, means in fixed relation to said light source yieldingly supporting the first mentioned means and retaining a portion of the latter in normal contact with the film.

13. In an optical apparatus of the class described, a cylindrical lens, means rotatably supporting said lens adapted to be interposed between a light source and film, means in fixed relation to said light source yieldingly supporting the first mentioned means and retaining a portion of the latter in normal contact with the film, and means for adjusting said light source with its fixed means in relation to the lens supporting means.

14. In an optical apparatus of the class described, a lens carrying member adapted to be interposed between a light source and film, a cylindrical lens rotatably mounted on said member provided with means projecting beyond the peripheral surface thereof, means in fixed relation to said light source yieldingly supporting the lens carrying member and retaining the projecting means of the lens in normal yielding contact with the film, and means for adjusting the light source with its fixed means in relation to the lens carrying means.

15. In an optical apparatus of the class described, a cylindrical lens adapted to be interposed between a light source and film, a member fixed in relation to said light source and movable therewith, and means yieldingly carried on said member and rotatably supporting said lens substantially in yielding contact with the film.

16. In an optical apparatus of the class described, a cylindrical lens adapted to be interposed between a light source and film, a member fixed in relation to said light source and movable therewith, and means yieldingly carried on said member and rotatably supporting said lens substantially in yielding contact with said film and means for adjusting said light source with its fixed member and adjunctive elements with respect to the film.

17. In an optical apparatus of the class described, a cylindrical lens rotatable on its axis and interposed between a light source and a film and means for yieldingly maintaining said rotatable lens substantially in contact with the film.

18. In an optical apparatus of the class described, a cylindrical lens rotatable on its axis and interposed between a light source and a film and means carried by said lens normally in contact with said film for slightly spacing the lens from the film.

STEWART C. WHITMAN.